United States Patent [19]
Yi

[11] Patent Number: 5,502,790
[45] Date of Patent: Mar. 26, 1996

[54] SPEECH RECOGNITION METHOD AND SYSTEM USING TRIPHONES, DIPHONES, AND PHONEMES

[75] Inventor: Jie Yi, Tokyo, Japan

[73] Assignee: Oki Electric Industry Co., Ltd., Tokyo, Japan

[21] Appl. No.: 993,395

[22] Filed: Dec. 21, 1992

[30] Foreign Application Priority Data

Dec. 24, 1991 [JP] Japan ................................. 3-341235
Jan. 13, 1992 [JP] Japan ................................. 4-004207
Jan. 13, 1992 [JP] Japan ................................. 4-004208

[51] Int. Cl.$^6$ ................................................. G10L 5/06
[52] U.S. Cl. ................................. 395/2.65; 395/2.64
[58] Field of Search ............................. 395/2.65, 2.63, 395/2.64, 2.52; 381/41, 43, 36

[56] References Cited

U.S. PATENT DOCUMENTS

| | | | |
|---|---|---|---|
| 4,759,068 | 7/1988 | Bahl et al. ........................... | 395/2.51 |
| 4,783,804 | 11/1988 | Juang et al. ......................... | 395/2.54 |
| 4,833,712 | 5/1989 | Bahl et al. ........................... | 395/2 |
| 4,882,759 | 11/1989 | Bahl et al. ........................... | 395/2.52 |
| 4,977,599 | 12/1990 | Bahl et al. ........................... | 395/2.65 |

OTHER PUBLICATIONS

Marcus et al., "A Variable Duration Acoustic Segment HMM for Hard-to-Recognize Words & Phrases," ICASSP '91: Acoustics, Speech, & Signal Processing Conf. Jul. 1991, pp. 281–284.

Wood et al., "Improved Vocabulary–Independent Sub-–Wood HMM Modelling," ICASSP '91: Acoustics Speech & Signal Processing Conf., Jul. 1991, pp. 181–184.

Rabiner, et al., "On the Application of Vector Quantization and Hidden Markov Models to Speaker–Independent, Isolated Word Recognition," Bell System Technical Journal, vol. 62, No. 4, Apr. 1983, pp. 1075–1105.

Levinson et al., "An Introduction to the Application of the Theory of Probabilistic Functions of a Markov Process to Automatic Speech Recognition," Bell System Technical Journal, vol. 62, No. 4, Apr. 1983, pp. 1035–1074.

Nakagawa, "Speech Recognition by Stochastic Models." Institute of Electronics, Information, and Communication Engineers of Japan, Jul. 1988, pp. 55 to 61.

*Primary Examiner*—Allen R. MacDonald
*Assistant Examiner*—Thomas J. Onka
*Attorney, Agent, or Firm*—Edward D. Manzo; Ted K. Ringsred

[57] ABSTRACT

A speech recognition system starts by training hidden Markov models for all triphones, diphones, and phonemes occurring in a small training vocabulary. Hidden Markov models of a target vocabulary are created by concatenating the triphone, diphone, and phoneme models, using triphone models if available, diphone HMMs when triphone models are not available, and phoneme models when neither triphone nor diphone models are available. Utterances from the target vocabulary are recognized by choosing a model with maximum probability of reproducing quantized utterance features.

22 Claims, 8 Drawing Sheets

SPEECH RECOGNITION METHOD AND SYSTEM USING TRIPHONES, DIPHONES, AND PHONEMES

BACKGROUND OF THE INVENTION

This invention relates to a method and system that uses models of triphones, diphones, and phoneroes to enable a machine to recognize spoken words, phrases, or sentences.

Speech recognition is an emerging technology with important applications in human-machine interfaces. Much recent work in this field has been directed toward statistical techniques based on stochastic modeling, using hidden Markov models.

A hidden Markov model (HMM) comprises a finite number of states with specified transition probabilities among the states. Each state is assumed to produce an observable value, referred to herein as a label, from a finite set of labels, which have different probability distributions for different states. In the context of speech recognition the labels represent classes of spectral features of audio waveforms. The model is hidden in the sense that while the labels are observable, the states that produce them are not.

An HMM speech recognizer has a dictionary of hidden Markov models corresponding to the words, phrases, or sentences to be recognized (referred to below as the target vocabulary). Given an utterance, the reeognizer reduces the utterance to a label sequence, calculates the probability of that label sequence in each of the models in its dictionary, selects the model giving the highest probability, and thus recognizes the corresponding word, phrase, or sentence.

The problem is to construct time dictionary. There exist algorithms for using sample data to train an HMM. One approach is to obtain spoken samples of the entire target vocabulary and train an IMM for reach item in the target vocabulary. A drawback of this approach is that it becomes impractical if the target vocabulary is very large. A second drawback is that when the target vocabulary is expanded, the entire training procedure must be repeated for every new target word, phrase, or sentence.

Another approach is to start by making a dictionary of phonemes, containing one HMM for each phoneme in the target language. These phoneme HMMs can be concatenated to form HMMs of arbitrary words, phrases, or sentences, and in this way a dictionary of the entire target vocabulary can be constructed. This approach suffers, however, from poor accuracy, because when phonemes are concatenated in speech, co-articulation or consecutive phonemes tends to disort their spectral features, so that they are recognized incorrectly.

Yet another approach is therefore to start from larger units such as diphones (two consecutive phonemes) or triphones (three consecutive phonemes), obtain HMMs of these, then assemble them into HMMs of words, phrases, or sentences. One problem in this approach is, again, the large amount of training data required. Even the Japanese language, with its comparatively simple phonetic structure, has more than six thousand triphones; obtaining and processing training data for the full set of triphones would be a prohibitively time-consuming task. Another problem is discontinuities that occur when, for example, triphone HMMs are assembled to create word HMMs.

SUMMARY OF THE INVENTION

It is accordingly an object of the present invention to construct hidden Markov models for a large target vocabulary from a small amount of training data.

Another object of the invention is to improve speech recognition accuracy be reducing discontinuities between consecutive triphones.

The invented speech recognition method starts by selecting a training vocabulary and creating a table listing all triphones, diphones, and phonemes occurring in the training vocabulary. Spoken samples of the training vocabulary are obtained and reduced to training data comprising sequences of labels, and segments of the training data corresponding to the triphones, diphones, and phonemes in the table are identified.

Next, for each triphone, diphone, and phoneme in the table, the corresponding segments of training data are used to train an HMM. The resulting triphone HMMs, diphone HMMs, and phoneme HMMs are stored in a first dictionary.

HMMs for the target vocabulary are now created by concatenating HMMs from the first dictionary, using triphone HMMs if available, diphone HMMs when triphone HMMs are not available, and phoneme HMMs when neither triphone nor diphone HMMs are available. The target HMMs created in this manner are stored in a second dictionary.

An utterance from the target vocabulary is recognized by reducing the utterance to a sequence of labels, computing the probabilities of producing that sequence of labels from each HMM in the second dictionary, and selecting an HMM that gives maximum probability.

DETAILED DESCRIPTION OF THE INVENTION

Figure 1:
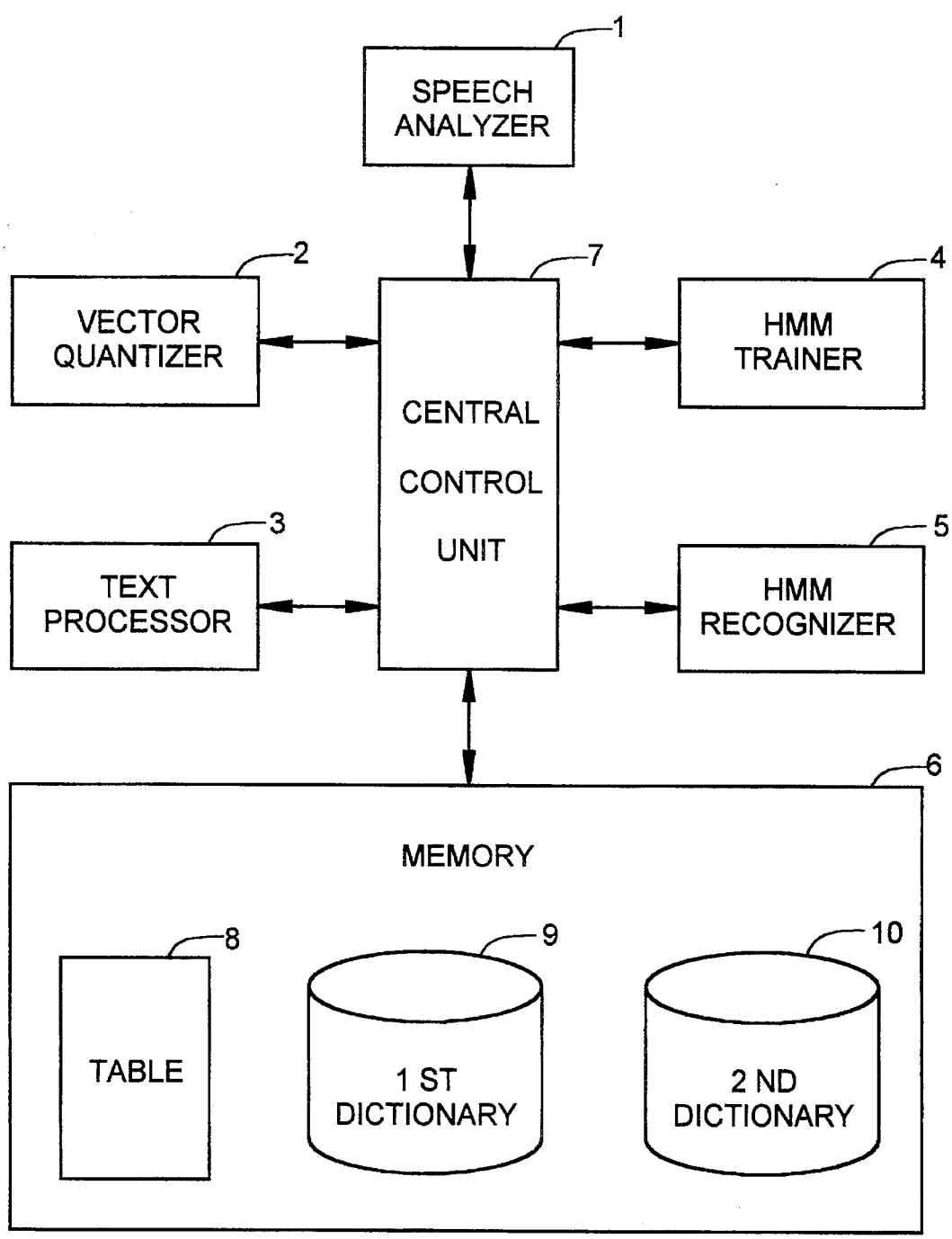
FIG. 1 a block diagram of the invented speech recognition system.

The invention will now be described in more detail with reference to the attached drawings. It will be assumed that the invention operates within a certain target language such as English, French, or Japanese. The term "phoneme" will therefore mean only phonemes occurring in the target language, and the target vocabulary will be a set of words, phrases, or sentences in the target language. These words, phrases, or sentences will be referred to as "items" in the target vocabulary. The invention is not restricted to any particular target language, nor is it restricted to the apparatus and procedures illustrated in the drawings, which are provided only as illustrations.

Practice of the invention will normally require both manual work and the use of computing apparatus. First an example of the computing apparatus will be described with reference to FIG. 1.

The apparatus in FIG. 1 is a speech recognition system that can be installed, for example, as part of a computer. The apparatus comprises a speech analyzer 1, a vector quantizer 2, a text processor 3, an HMM trainer 4, an HMM recognizer 5, a memory 6, and a central control unit 7. The speech analyzer 1, vector quantizer 2, and HMM recognizer 5, which must operate in real time, are preferably implemented as specialized processors such as digital signal processors. The text processor 3 and the HMM trainer 4 may be implemented as specialized processors, or as programs running on a general-purpose processor such as the central processing unit of a computer. The memory 6 comprises, for example, both semiconductor memory for high-speed access and disk memory for non-volatile storage. Among the information stored in the memory 6 are a table 8, a first dictionary 9, and a second dictionary 10, which will be described later. The operations of the speech analyzer 1, vector quantizer 2, text processor 3, HMM trainer 4, HMM recognizer 5, and memory 6 are coordinated by the central control unit 7 which comprises, for example, a microprocessor.

The functions off the elements in FIG. 1 will be explained as the speech recognition method is described below, with reference to FIGS. 2 to 8. Detailed descriptions of the hardware will be omitted since microprocessors, digital signal processors, and-the like are well known to those skilled in the art.

Figure 2:
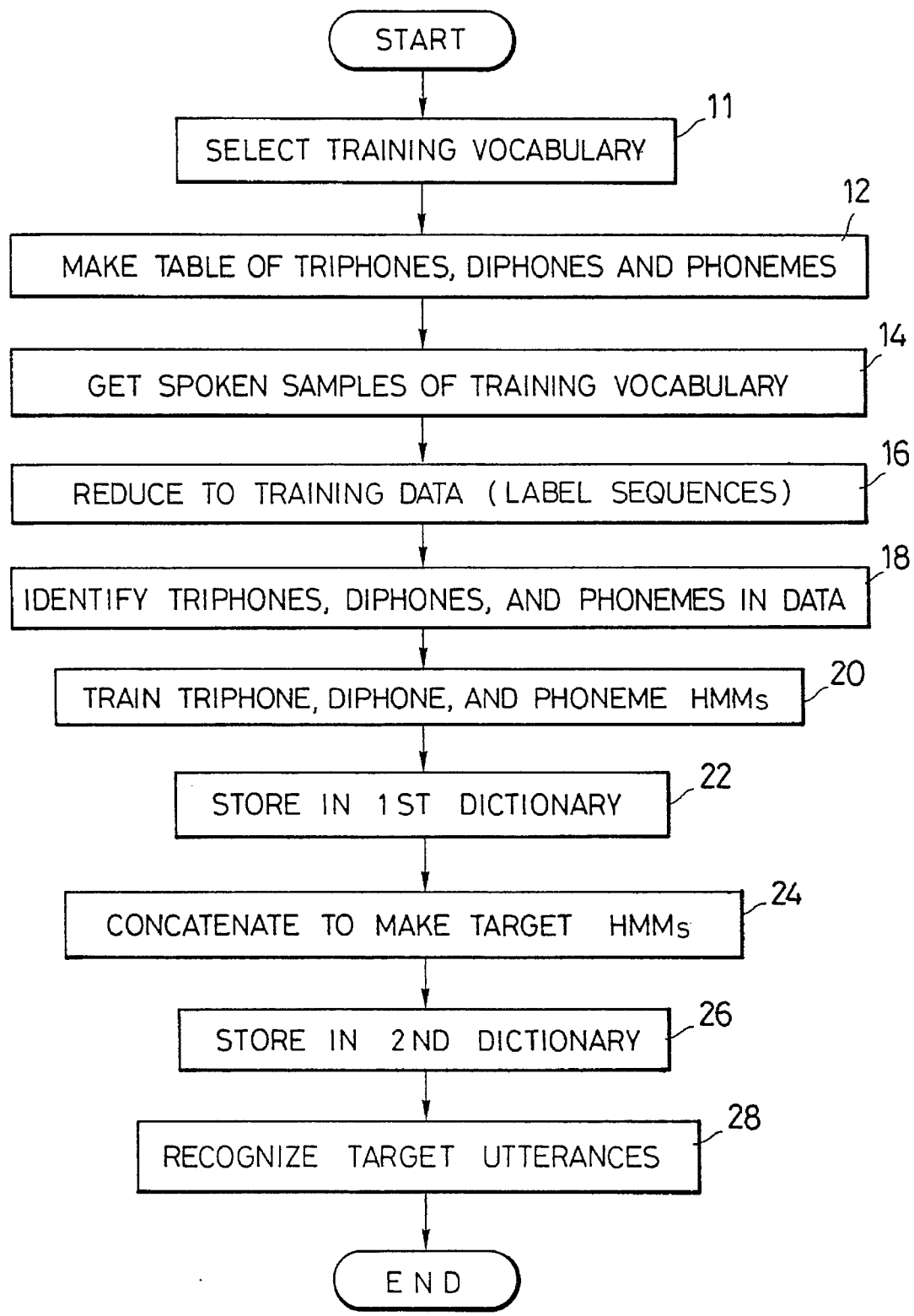
FIG. 2 is a flowchart of the invented speech recognition method.

Referring to FIG. 2, the first step 11 is to select a training vocabulary of words, phrases, or sentences. The training vocabulary preferably includes examples of all phonemes occurring in the target language. However, the training vocabulary need not include all diphones or triphones, and need not include all, or even any, of the items in the target vocabulary.

The next step 12 is to make a table of all the triphones, diphones, and phonemes occurring in the training vocabulary. This step is performed by the text processor 3, which thereby creates the table 8 shown in FIG. 1. The training vocabulary is input to the text processor 3 by typing from a keyboard, for example, preferably no spelling the vocabulary as in everyday text but by entering the phonetic symbols used by linguists to represent phonemes. Thus the text processor 3 receives the training vocabulary in the form of sequences of phoneme symbols.

Phoneme symbols can be typed as ordinary letters or letter combinations delimited by symbols such as slashes. If the text processor 3 receives, for example, the sequence of phoneme symbols /n/+/a/+/r/+/a/ (a Japanese place name), it extracts two triphones (/nar/and/ara/), three diphones (/ha/, /ar/, and/ra/), and three phonemes (/n/, a/, and/r/) and adds them to the table 8.

Used Fully in this way, a comparatively small training vocabulary can quickly generate an extensive table 8 of triphones, diphones, and phonemes. A training vocabulary comprising one hundred city names, For example, yielded some three-hundred eighty triphones, one-hundred eighty diphones, and a complete set of phonemes For the Japanese language.

The table 8 created by the text processor 3 can be printed as a numbered list like that shown, for example, in Table 1.

TABLE 1

Table of Triphones, Diphones, and Phonemes

| No. | | No. | | No. | | No. | |
|---|---|---|---|---|---|---|---|
| 1 | /a/ | 101 | /ef/ | 201 | /zu/ | 301 | /gur/ |
| 2 | /b/ | 102 | /ek/ | 202 | /aba/ | 302 | /hab/ |
| 3 | /d/ | 103 | /en/ | 203 | /abu/ | 303 | /hak/ |
| . | . | . | . | . | . | . | . |
| . | . | . | . | . | . | . | . |
| . | . | . | . | . | . | . | . |

The next step 14 is to obtain spoken samples of the training vocabulary items (words, phrases, or sentences). If the goal is speaker-independent recognition of the target vocabulary, then samples spoken by different people should be obtained.

The next step 16 is to reduce the spoken samples to training data comprising sequences of labels. This step is carried out by the speech analyzer 1 and the vector quantizer 2 in FIG. 1.

The speech analyzer 1 analyzes digitized waveforms of the spoken samples to produce feature vectors. A single feature vector represents features of a short interval (typically less than a tenth of a second) in a spoken sample. The feature vector comprises, for example, a cepstrum of linear predictive coefficients. Linear predictive analysis is well known, so a description will not be given here. The invention is of course not limited to use of linear predictive analysis.

The possible values of the feature vectors cover a continuous range of real numbers, so the number of possible feature vectors is huge. The vector quantizer 2 maps this continuous range onto a discrete set of M labels, where M is a positive integer that is much smaller than the number of possible feature vectors. The labels can conveniently be taken to be the integers from one to M. Vector quantization techniques are well known and will not be described in detail here. The sequences of labels corresponding to the spoken samples are stored in the memory 6 as training data.

The next step 18 is to identify segments of the training data corresponding to the triphones, diphones, and phonemes listed in the table 8 created in step 12. This process cannot, at present, be carried out automatically; it is necessary for a person to listen to the spoken samples, watch their waveforms on a display, and indicate, e.g. by pressing a key, where each triphone, diphone, or phoneme begins and ends. The considerable labor involved in this process is one reason for the desirability of a small training vocabulary.

Once the triphones, diphones, and phonemes have been identified by eye, ear, and hand, the central control unit 7 in FIG. 1 can easily mark corresponding segments of labels in the training data. For each triphone, diphone, and phoneme the central control unit 7 stores a set of pointers to the corresponding segments in the training data.

The next step 20 is to construct an HMM of each triphone, diphone, and phoneme in the table 8 output by the text processor 3. This step is performed by the HMM trainer 4 in FIG. 1. The HMM trainer 4 begins by selecting, for example, the first triphone in the table 8. Using the pointers stored by the central control unit 7 in the preceding step, the HMM trainer 4 next gets all segments of training data corresponding to that triphone.

The HMM trainer 4 next, selects an initial HMM having, for example, three states. The HMM is represented by a three-by-three matrix $\{a_{ij}\}$ wherein $a_{ij}$ is the transition probability from the i-th state to the j-th state, and a three-by-M matrix $\{b_{jk}\}$ wherein $b_{jk}$ is the output probability of the k-th label when the model is in the j-th state.

Figure 3:
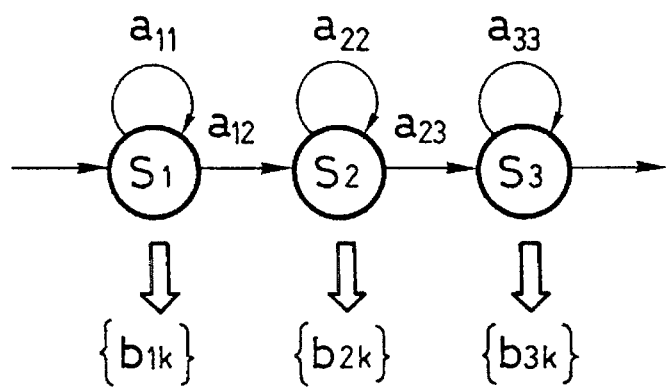
FIG. 3 is a state transition diagram illustrating an HMM.

The HMM is preferably of the left-to-right type illustrated in FIG. 3, in which each state has only two possible transitions: a transition to the same state, and a transition to the next state. The model always starts in state $S_1$. From state $S_1$ the model can either remain in slate $S_1$ (with probability $a_{11}$), or advance to state $S_2$ (with probability $a_{12}$). The sum of $a_{11}$ and $a_{12}$ is unity. Similarly, From state $S_2$ the model can remain in state $S_2$ or advance to state $S_3$, and the sum of $a_{22}$ and $a_{23}$ is unity. For mathematical rigor $a_{33}$ should also be unity, but for purposes of concatenating HMMs this requirement can be relaxed: $a_{33}$ can be less than unity, allowing a transition from state $S_3$ to the first state of another unspecified HMM.

The model makes state transitions at fixed intervals, corresponding to the intervals into which the speech analyzer 1 divided the spoken samples. After each state transition, the model produces a label value from the set of M labels (equivalently, it produces an integer from one to M). For each j the output probabilities $b_{jk}$, are a discrete probability distribution; that is, they are non-negative real numbers such that $b_{j1}+b_{j2}+\ldots +b_{jM}=1$.

The HMM trainer 4 assigns arbitrary initial values to the $\{a_{ij}\}$ and $\{b_{jk}\}$, then trains the model by following a procedure that improves these values in light of the training data for the corresponding triphone. More specifically, the training procedure increases the probability that the model would reproduce the actual training data. One possible training procedure uses the well-known Baum-Welch forward-backward algorithm, a brief description of which follows.

Suppose, for example, that one segment of training data corresponding to the triphone in question comprises a sequence of T labels $\{O_1, O_2, \ldots, O_T\}$. Using the current values of $\{a_{ij}\}$ and $\{b_{jk}\}$, for each t from one to T and each i from one to three, the HMM trainer 4 computes the probability $\alpha_t(i)$ that the model will produce the sequence $O_1, O_2, \ldots, O_t$ and be in state $S_i$ at time t, and the probability $\beta_t(i)$ that the model will produce the sequence $O_{t+1}, O_{t+2}, \ldots, O_T$ given that it is in state $S_i$ at time t.

$$\alpha_t(i)=P(O_1 O_2 \ldots O_t \text{ and state i at time t})$$

$$\beta_t(i)=P(O_{t+1}O_{t+2}\ldots O_T \mid \text{state i at time t})$$

Next the HMM trainer 4 computes a new set of values to replace $\{a_{ij}\}$ and $\{b_{jk}\}$ as follows:

$$\hat{a}_{ij} = \frac{\sum_{t=0}^{T-1} \alpha_t(i)a_{ij}b_j(O_{t+1})\beta_{t+1}(j)}{\sum_{t=0}^{T-1} \alpha_t(i)\beta_t(i)}$$

$$\hat{b}_j(k) = \frac{\sum_{\substack{t:\\O_t=k}} \alpha_t(i)a_{ij}b_j(O_t)\beta_{t+1}(j)}{\sum_{t=0}^{T-1} \alpha_t(i)a_{ij}b_j(O_t)\beta_{t+1}(j)}$$

In these formulas, if $O_t$ is the k-th label, then $b_j(O_t)$ has the same meaning as $b_{jk}$.

This process is repeated, using all the training data for the triphone in question, until further repetitions would not significantly increase the model's probability of reproducing the actual training data. Alternatively, the process is repeated a certain number of times, then stopped.

After the HMM for the first triphone has been trained it is stored in the memory 6. The HMM trainer 4 then gets the next triphone from the table 8 and trains an HMM for it in the same way.

After training HMMs for all the triphones in the table 8, the HMM trainer 4 starts in on the diphones and proceeds in the same way, except that this time each HMM comprises two states instead of three. After completing the diphones, the HMM trainer 4 next creates HMMs for the phonemes, this time using one-state models.

The invention is not restricted to the use of three-state, two-state, and one-state models for triphones, diphones, and phonemes, but the triphone models should at least be longer than the diphone models, and the diphone models should be longer than the phoneme models. The purpose is to reduce the amount of computation by avoiding unnecessarily long models for diphones and phonemes.

The invention is also not restricted to use of the Baum-Welch forward-backward algorithm. Other algorithms, which have been described in the Markov-chain literature, can be used to train tie HMMs.

When the preceding step 20 is completed, the result is a collection of triphone HMMs, diphone HMMs, and phoneme HMMs. The next step 22 in FIG. 2 is to store these HMMs in the first dictionary 9 in the memory 6.

In the next step 24, the HMMs in the first dictionary 9 are concatenated to create HMMs for the target vocabulary. This step is carried out by the text processor 3, the HMM trainer 4, and the central control unit 7.

The target vocabulary is input to the text processor 3 in the form of phoneme sequences, in the same way as the training vocabulary was Input. The text processor 3 decomposes each item in the target vocabulary into a sequence of triphones, diphones, and phonemes occurring in the table 8. In doing so, the HMM trainer 4 gives highest preference to triphones and lowest preference to phonemes. It uses diphones only when a necessary triphone is not present in the table 8 and therefore has no model available in the first dictionary 9. Phonemes are used only when triphones and diphones are both unavailable.

For example, Table 2 shows five possible decompositions of the Japanese place name "Meguro." Among these five decompositions, the text processor 3 uses /meg/+/uro/ if meg/ and /uro/are both present in the table 8. If only one of them is present, the text processor 3 attempts to use meg/+/ur/+/o/ or /me/+/gur/+/o/. If these choices are also unavailable, the text processor 3 attempts to decompose the word into three diphones (/me/+/gu/+/ro/). If none of these diphones is available in the table 8, the text processor 3 Finally resorts to the purely phoneme decomposition /m/+/e/+/g/+/u/+/r/+/o/.

The Five decompositions of "Meguro" in Table 2 are not the only ones possible. In particular, overlapping decompositions are also possible, as will be shown later.

TABLE 2

| Some Non-Overlapping Decompositions of "Meguro" | |
|---|---|
| Triphones | /meg/ + /uro/ |
| Triphone, diphone, and phoneme | /meg/ + /ur/ + /o/ |
|  | /me/ + /gur/ + /o/ |
| Diphones | /me/ + /gu/ + /ro/ |
| Phonemes | /m/ + /e/ + /g/ + /u/ + /r/ + /o/ |

Figure 4:
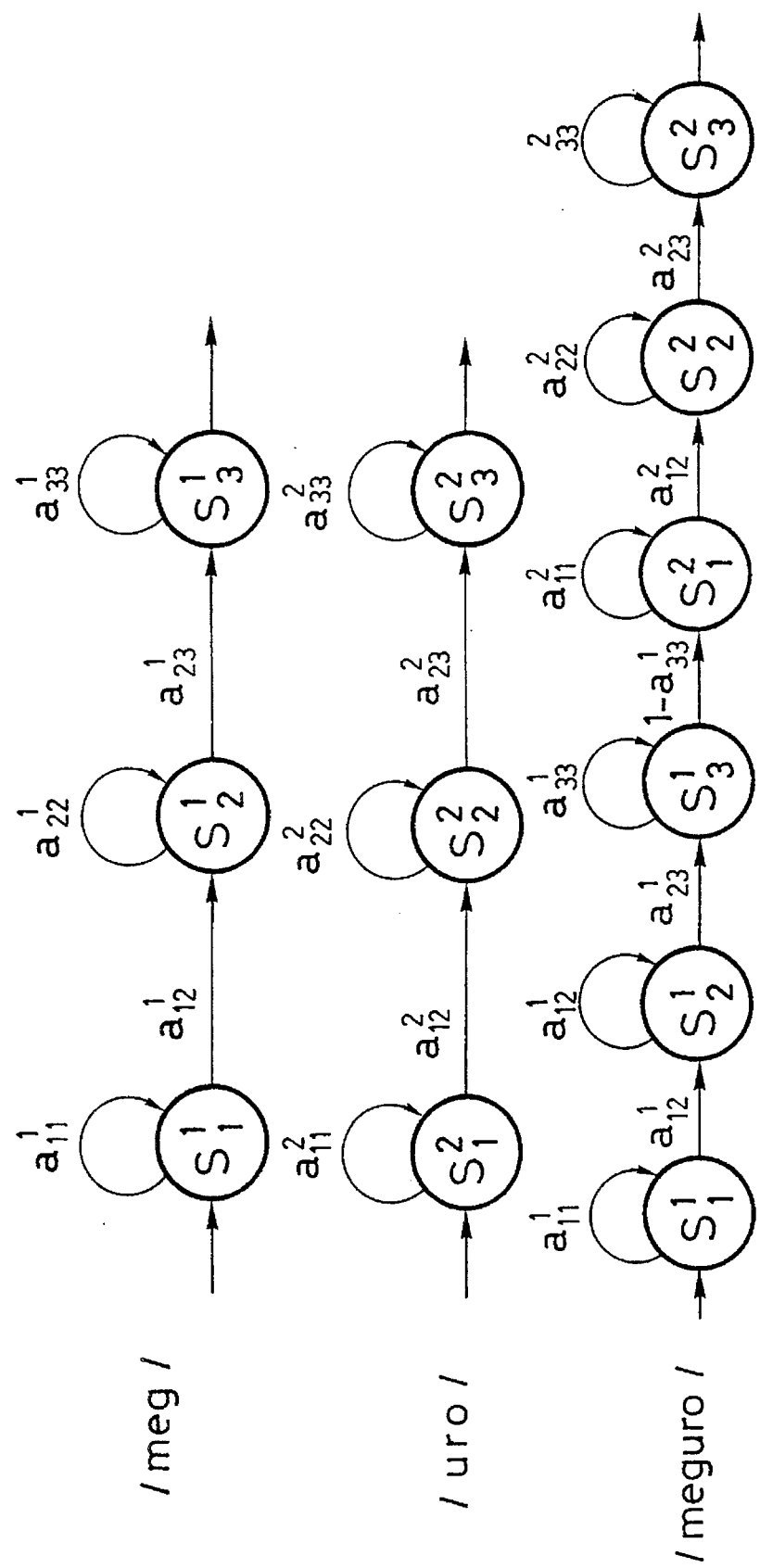
FIG. 4 illustrates the concatenation of two non-overlapping HMMs.

After the text processor 3 has decomposed an item of the target vocabulary, the central control unit 7 Fetches the corresponding triphone, diphone, and phoneme HMMs from the first dictionary 9 and the HMM trainer 4 concatenates them to Form a target HMM. This can be done, for example, as shown in FIG. 4 for the case of /meg/+/uro/. The HMM trainer 4 simply assigns a transition probability of one minus $a_{33}^1$ to the transition from the last state $S_3^1$ of the /meg/ HMM to the first state $S_1^2$ of the/uro/ HMM forming a six-state target HMM for /meguro/, with the same output probabilities as in the /meg/ and /uro/ HMMs.

The invention is not restricted to the simple method of concatenation illustrated in FIG. 4. A method of overlapping concatenation will be illustrated later, and other concatenation methods may be used as well.

Referring again to FIG. 2, in the next step 26 the central control unit 7 stores each target HMM created by the HMM trainer 4 in a second dictionary 10 in the memory 6, together with the target vocabulary item represented by the target HMM. The target vocabulary item may now be stored as ordinary text, rather than as a phoneme sequence. The result is a second dictionary 10 comprising one target HMM for each item in the target vocabulary.

In the final step 28 the system uses the second dictionary 10 to recognize utterances which are presumed to be from the target vocabulary. This step is carried out by the speech analyzer 1, the vector quantizer 2, and the HMM recognizer 5. When an utterance is received, the speech analyzer 1 and vector quantizer 2 reduce it to a sequence of labels, in the same way that they reduced the training vocabulary to label sequences. Next the HMM recognizer 5 computes, for each HMM in the second dictionary 10, the probability that the HMM would output the particular sequence of labels. Then the HMM recognizer 5 selects the HMM giving maximum probability, and recognizes the utterance as the corresponding item in the target vocabulary.

One advantage of this method of speech recognition is that it does not require a large amount of training data. Instead, it exploits a limited amount of training data to the fullest by using all triphones, diphones, and phonemes occurring in the training data.

A second advantage is that the target vocabulary can be expanded without acquiring additional training data. It is only necessary to enter the phoneme sequences corresponding to new target vocabulary items, create new target HMMs by concatenating the existing triphone, diphone, and phoneme HMMs in the first dictionary 9, and add the new target HMMs to the second dictionary 10. Moreover, there is no restriction on the length of the new target items. A system that was originally trained to recognize isolated words, for example, can be expanded to recognize phrases or longer units of speech.

A third advantage is that, by using triphones in preference to diphones and phonemes, the system achieves a high level of recognition accuracy despite the small size of the training vocabulary. Computer simulation using a training vocabulary of one hundred place names, for example, has shown a recognition accuracy equaling that of prior-art systems that train full-word HMMs of the entire target vocabulary directly.

Next one example of a procedure for creating target HMMs will be shown.

Figure 5:
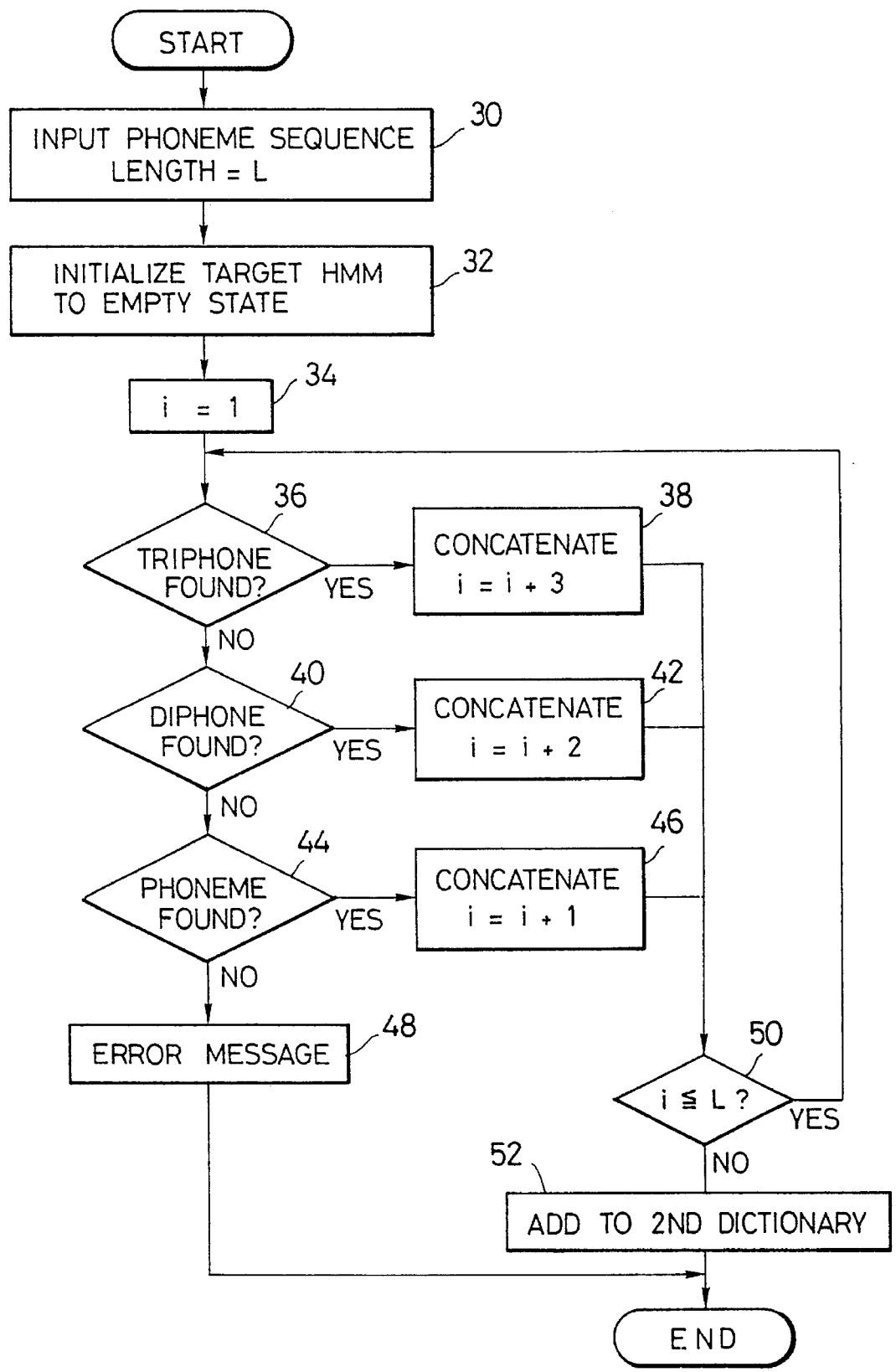
FIG. 5 is a flowchart illustrating the creation of a target HMM.

Referring to FIG. 5, the first step 30 is to input a phoneme sequence representing an item in the target vocabulary, and count the length L of the sequence.

The next step 32 is to initialize a target HMM. The initial state is the empty HMM consisting of no states, and representing no utterance.

The next step 34 is to initialize a pointer i to the value one, indicating the first phoneme in the input phoneme sequence.

The next step 36 is to search the first dictionary 9 for the triphone comprising the phoneme at the pointer position and the next two phonemes in the input phoneme sequence.

If this triphone is found, the next step 38 is to read the corresponding triphone HMM from the first dictionary 9, concatenate it at the end of the target HMM, increment the pointer i by three, thus advancing the pointer position by three phoneme positions in the input phoneme sequence, and jump to step 50 described below.

If the triphone sought in step 36 is not found, the next step 40 is o search the first dictionary 9 for the diphone comprising the phoneme at the pointer position and the next phoneme in the input phoneme sequence.

If this diphone is found, the next step 42 is to read the corresponding diphone HMM from the first dictionary 9, concatenate it at the end of the target HMM, increment the pointer i by two, thus advancing the pointer position by two phoneme positions in the input phoneme sequence, and jump to step 50 described below.

If the diphone sought in step 40 is not found, the next step 44 is to search the first dictionary 9 for the phoneme at the pointer position.

If this phoneme 1s found, the next step 46 is to read the corresponding phoneme HMM from the first dictionary 9, concatenate it at the end of the target HMM, increment the pointer i by one, thus advancing the pointer position by one phoneme position in the input phoneme sequence, and jump to step 50 described below.

If this phoneme is not found, the next step 48 is to issue an error message and end. If the training vocabulary contains a complete set of phonemes, then step 48 will of course not occur.

The next step 50 is to compare the pointer value i with the length L of the phoneme sequence. If i is equal to or less than L, the process returns to step 36 to search for the next triphone, diphone, or phoneme.

If i 1s greater than L, then in the next step 52 the target HMM is stored in the second dictionary 10, together with the target vocabulary item it represents, and the process ends.

The procedure in FIG. 5, which concatenates HMMs without overlap, is only one of many possible procedures. A procedure for concatenating overlapping HMMs will be described next.

Figure 6:
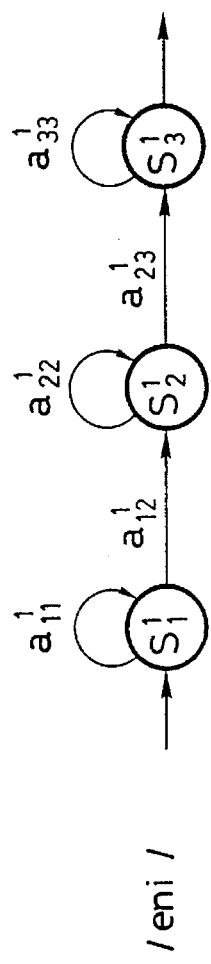
FIG. 6 illustrates the concatenation of two overlapping HMMs.
Figure 6:
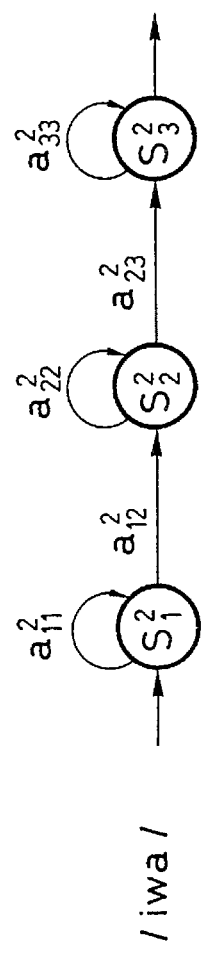
Figure 6:
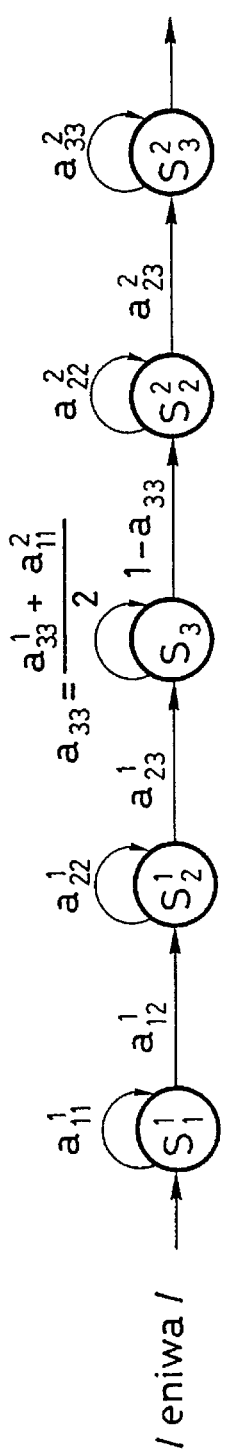

FIG. 6 illustrates the creation of an HMM for the five-phoneme word "Eniwa," (another Japanese place name) from HMMs for the two triphones/eni/ and /iwa/. These two triphones overlap at the phoneme /i/, so when their HMMs are concatenated, the last state $S_3^1$ of the /eni/ HMM is combined with the first state $S_1^2$ of the iwa/HMM to form a new state $S_3$ in the target HMM. The transition probabilities of the combined state $S_3$ are calculated by averaging the transition probabilities of $S_3^1$ and $S_2^1$, as follows:

$$a_{33}=(a_{33}^1+a_{11}^2)/2$$

$$a_{34}=1-a_{33}$$

The output probabilities $\{b_{3k}\}$ are also calculated by averaging, as follows:

$$b_{3k}=(b_{3k}^1+b_{1k}^2)/2 \ (k=1, 2 \ldots, M)$$

Concatenating overlapping triphones and averaging their transition probabilities tends to smooth out the transitions from one triphone to the next, thereby improving the accuracy of the recognition system.

The same type of overlapping also can be carried out with diphones, or with triphones and diphones. For example, the name "Meguro" can be decomposed into overlapping triphones and diphones as follows:

/meg/+/gur/+/ro/

In processing the target vocabulary, the text processor 3 can be adapted to preferentially seek overlapping decompositions such as the above before seeking non-overlapping decompositions. A flowchart for concatenating HMMs in this case will be shown next. For simplicity, the steps of initializing and updating pointers will be omitted.

Figure 7:
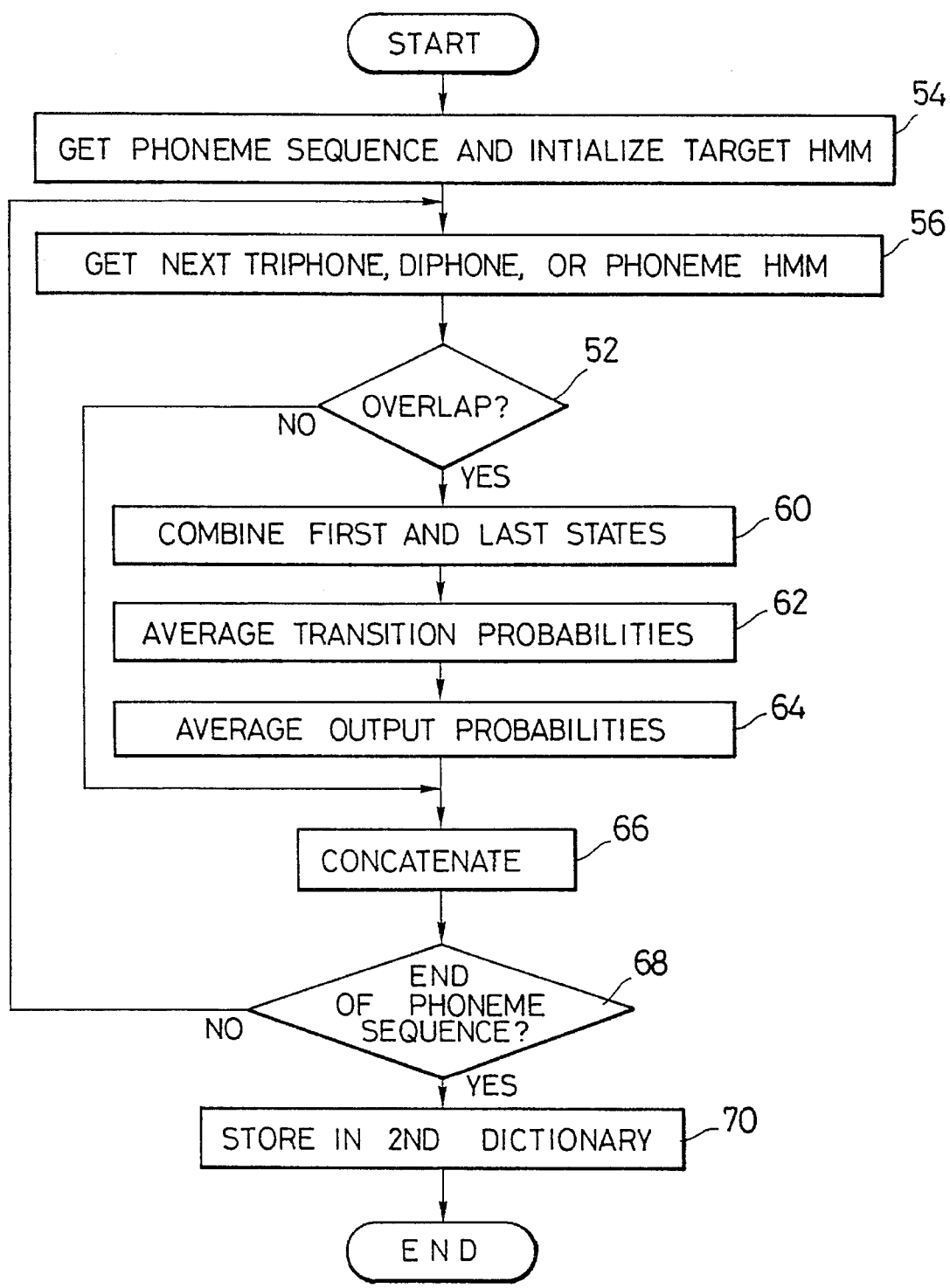
FIG. 7 is a flowchart illustrating the creation of a target HMM using overlapping HMMs.

Referring to FIG. 7, in the first step 54 the text processor 3 inputs the phoneme sequence of a target vocabulary item and initializes a target HMM to the empty state.

In the next step 56, the text processor 3 selects the next triphone, diphone, or phoneme HMM to add to the target HMM. The procedure is generally similar to the selection procedure illustrated in FIG. 5, but is modified so that if possible, the text processor 3 selects an overlapping triphone or diphone. The first time this step is performed, the "next" triphone, diphone, or phoneme is the first triphone, diphone, or phoneme of the target phoneme string.

The next step 58 is a decision step in which the text processor 3 decides whether the selected HMM overlaps the previously selected HMM. If it does, the central control unit 7 carries out the next three steps 60, 62, and 64. If it does not, the central control unit 7 skips these steps and proceeds directly to step 66.

If the selected HMM and previous HMM overlap (that is, if their corresponding triphones or diphones overlap), in the next step 60 the HMM trainer 4 combines the first state of the selected HMM with the last state of the previous HMM.

In the next step 62 the HMM trainer 4 averages the transition probabilities of the two combined states as explained above.

In the next step 64 the HMM trainer 4 averages the output probabilities of the two combined states as explained above.

In the next step 66 the HMM trainer 4 concatenates the selected HMM to the target HMM.

In the next step 68, if the end of the target phoneme string has not yet been reached, the process returns to step 56 to get the next triphone, diphone, or phoneme HMM.

If the end of the target phoneme has been reached, in the next step 70 the target HMM and its corresponding target vocabulary item are added to the second dictionary 10 and the process ends.

The decision step 58 in FIG. 7 can be omitted; that is, it is possible to overlap HMMs unconditionally, regardless of whether the corresponding triphones, diphones, or phonemes overlap or not. Unconditional overlapping of HMMs should generally be carried out only in systems that use HMMs with more than one state to model phonemes, more than two states to model diphones, and more than three states to model triphones.

Different users of the invented recognition system may have different speed and accuracy requirements. It is therefore advantageous to allow the user to select the lengths of the triphone, diphone, and phoneme HMMs, longer models resulting in higher accuracy and shorter models in higher speed. The training procedure can then be modified as described next.

Figure 8:
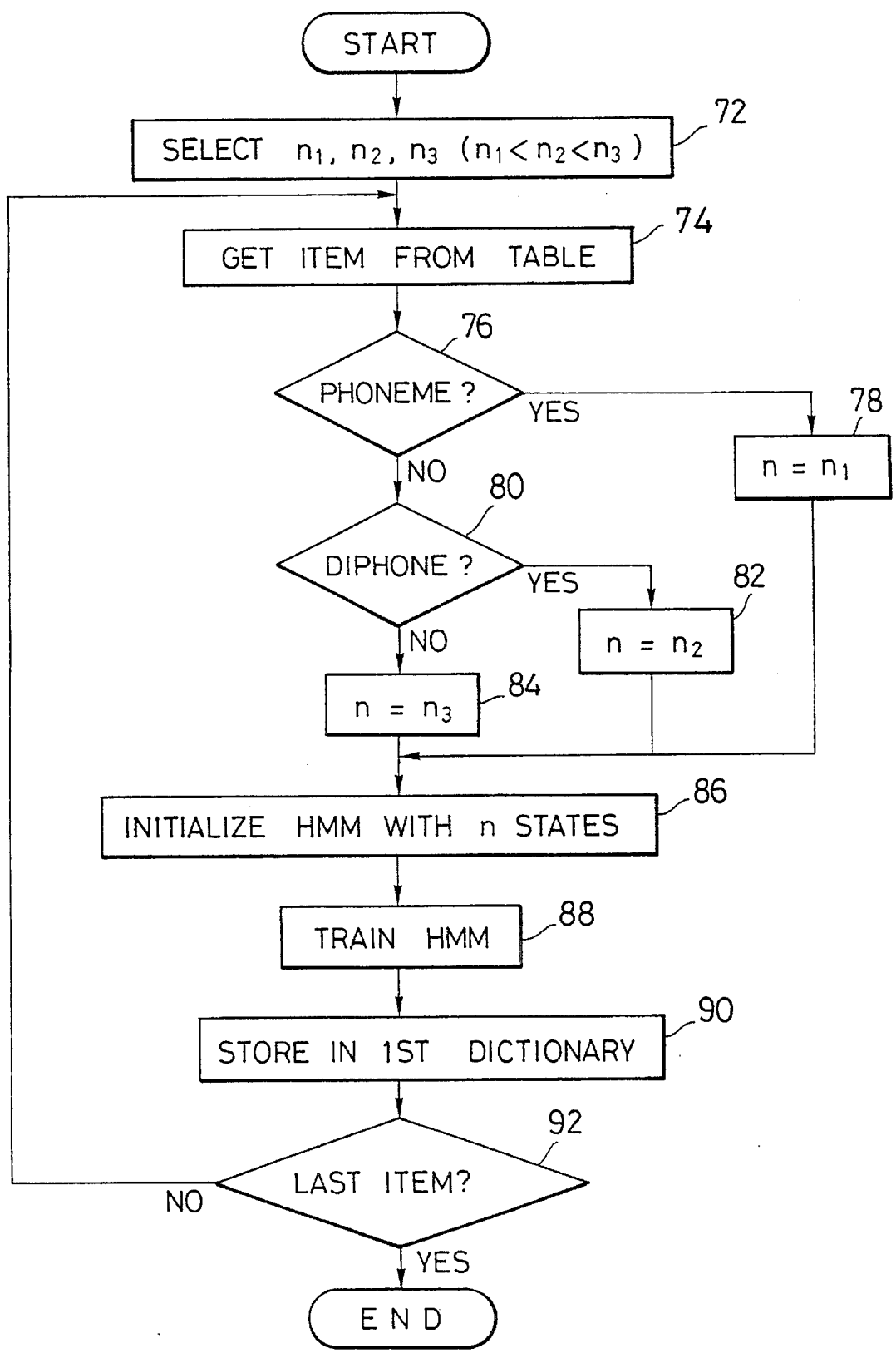
FIG. 8 is a flowchart illustrating the selection of model length.

Referring to FIG. 8, in the first step 72 the user selects three positive integers $n_1$, $n_2$, and $n_3$ as the lengths of the phoneme, diphone, and triphone HMMs. These integers should satisfy the relationship:

$$n_1 < n_2 < n_3$$

In the next step 74 the HMM trainer 4 fetches an item from the table 8 of phonemes, diphones, and triphones present in the training vocabulary.

In the next steps 76 to 84, a variable n is set to the value $n_1$ if the item is a phoneme, $n_2$ if the item is a diphone, or $n_3$ if the item is neither a phoneme nor a diphone and is therefore a triphone.

In the next step 86 an HMM with n states is initialized by assigning transition and output probabilities to its states.

In the next step 88 the HMM is trained using the forward-backward algorithm or another algorithm and the training data.

In the next step 90 the trained HMM is stored in the first dictionary 9.

In the next step 92, if this is not the last item in the table 8, the HMM trainer 4 returns to step 74 to get the next item. If this is the last item, the process ends.

Allowing the user to select the lengths of the models enables the user to increase the accuracy or speed of the recognition process simply by varying these length parameters, without having to obtain new training data.

The invention can of course be practiced with procedures other than those illustrated in the foregoing flowcharts. If triphone models having six states are used, for example, then the procedure for concatenating HMMs of overlapping triphones can be modified so that the last two states of one triphone HMM are combined with the next two states of the following triphone HMM. A further possible refinement would be to concatenate HMMs of overlapping triphones in this way, and concatenate HMMs of non-overlapping triphones by combining only the last state of the first HMM with the first state of the following HMM. Those skilled in the art will notice many other modifications that can be made without departing from the spirit and scope of the invention, which should be determined solely from the following claims.

What is claimed is:

1. A speech recognition method for recognizing a target vocabulary of words, phrases, or sentences, comprising the steps of:

(a) selecting a training vocabulary;

(b) listing in a table (8) all triphones, diphones, and phonemes occurring in said training vocabulary;

(c) obtaining spoken samples of said training vocabulary;

(d) reducing said spoken samples to training data comprising sequences of labels;

(e) identifying, in said training data, segments corresponding to the triphones, diphones, and phonemes in said table (8);

(f) using the labels obtained in step (d) and segments identified in step (e) to construct a triphone HMM for each triphone in said table (8), and diphone HMM for each diphone in said table (8), and a phoneme HMM for each phoneme in said table (8);

(g) storing each triphone HMM, diphone HMM, and phoneme HMM constructed in step (f) in a first dictionary (9) consisting of the HMMs thus stored;

(h) creating HMMs for the target vocabulary by concatenating HMMs from said first dictionary (9), using triphones HMMs if available in said first dictionary (9), using diphone HMMs when triphone HMMs are not available, and using phoneme HMMs when neither triphone nor diphone HMMs are available.

(i) storing the HMMs created in step (h) in a second dictionary (10); and (j) recognizing an utterance by reducing the utterance to a sequence of labels, computing probabilities of producing said sequence of labels from each HMM in said second dictionary (10), and selecting an HMM giving maximum probability.

2. The method of claim 1, wherein the training vocabulary selected in step (a) includes examples of all phonemes occurring in the target vocabulary.

3. The method of claim 1, wherein the step (d) of reducing the spoken samples comprises further steps of:

calculating feature vectors of each spoken sample; and mapping the calculated feature vectors onto a discrete set of labels.

4. The method of claim 3, wherein the feature vectors comprise linear prediction coefficients.

5. The method of claim 1, wherein the step (f) of constructing triphone, diphone, and phoneme HMMs is carried out using a forward-backward algorithm.

6. The method of claim 1, wherein the step (h) of constructing HMMs for the target vocabulary comprises further steps of:

(h1) representing an item, in the target vocabulary as a sequence of phonemes, starting from a first phoneme;

(h2) initializing a target HMM to a state representing no utterance;

(h3) setting a pointer position at said first phoneme;

(h4) searching said first dictionary (9) for a triphone HMM corresponding to three phonemes starting at said pointer position;

(h5) if a triphone HMM is found in step (h4), concatenating that triphone HMM to said target HMM and advancing said pointer position by three phoneme positions in said sequence of phonemes;

(h6) if no triphone HMM is found in step (h4), searching said first dictionary (9) for a diphone HMM corresponding to two phonemes starting at said pointer position;

(h7) if a diphone HMM is found in step (h6), concatenating that diphone HMM to said target HMM and advancing said pointer position by two phoneme positions in said sequence of phonemes;

(h8) if no diphone HMM is found in step (h6), searching said first dictionary (9) for a phoneme HMM corresponding to one phoneme at said pointer position;

(h9) if a phoneme HMM is found in step (h8), concatenating that phoneme HMM to said target HMM and advancing said pointer position by one phoneme position in said sequence of phonemes;

(h10) if no phoneme HMM is found in step (h6), issuing an error message; and (h11) repeating steps (h4) to (h10) until said sequence of phonemes is exhausted.

7. The method of claim 1, wherein said triphone HMMs, said diphone HMMs, and said phoneme HMMs are left-to-right HMMs.

8. The method of claim 1, wherein said triphone HMMs have more states than said diphone HMMs, and said diphone HMMs have more states than said phoneme HMMs.

9. The method of claim 8, wherein said triphone HMMs have three states, said diphone HMMs have two states, and said phoneme HMMs have one state.

10. The method of claim 1, wherein said triphone HMMs, said diphone HMMs, and said phoneme HMMs are concatenated without overlap in step (h).

11. The method of claim 1, wherein pairs of said triphone HMMs are concatenated with overlap, if possible, in step (h).

12. The method of claim 11 wherein, when a first triphone HMM ending in a last state is concatenated with overlap with a second triphone HMM beginning with a first state, said last state and said first state are combined to form a new middle state.

13. The method of claim 12, wherein transition probabilities of said middle state are computed by averaging transition probabilities of said first state and said last state.

14. The method of claim 12, wherein output probabilities of said middle state are computed by averaging output probabilities of said first state and said last state.

15. The method of claim 1, comprising the additional step of selecting three positive integers $n_1$, $n_2$, and $n_3$, wherein:

each phoneme HMM constructed in said step (f) has $n_1$ states;

each diphone HMM constructed in said step (f) has $n_2$ states; and each triphone HMM constructed in said step (f) has $n_3$ states.

16. A speech recognition system for recognizing words, phrases, or sentences in a target vocabulary, comprising:

a speech analyzer (1) for analyzing spoken utterances and producing feature vectors;

a vector quantizer (2) for mapping said feature vectors onto a discrete set of labels;

a text processor (3) for receiving training sequences of phoneme symbols, creating a table (8) of triphones, diphones, and phonemes occurring in said training sequences, receiving target sequences of phoneme symbols occurring in said target vocabulary, and dividing said target sequences into triphones, diphones, and phonemes occurring in said table (8), selecting triphones in preference to diphones, triphones in preference to phonemes, and diphones in preference to phonemes;

an HMM trainer (4) for using labels output by said vector quantizer (2) to construct a first dictionary (9) comprising HMMs of the triphones, diphones, and phonemes in said table (8), and concatenating HMMs selected from said first dictionary (9) to construct a second dictionary (10) of HMMs of items in the target vocabulary;

an HMM recognizer (5) for calculating probabilities that HMMs in said second dictionary (10) would produce a sequence of labels output by said vector quantizer (2), and selecting an HMM giving a maximum probability;

a memory (6) for storing said table (8), said first dictionary (9) and said second dictionary (10); and a central control unit (7) coupled to control said speech analyzer (1), said vector quantizer (2), said text processor (3), said HMM trainer (4), said HMM system, and said memory (6).

17. The system of claim 16 wherein, as far as possible, said text processor (3) divides said target sequences into overlapping triphones.

18. The system of claim 17 wherein, at least in cases of overlapping triphones, said HMM trainer (4) concatenates HMMs by combining a last state of one HMM with a first state of another HMM to create a new middle state.

19. The system of claim 18, wherein said trainer HMM computes transition probabilities of said new middle state by averaging transition probabilities of said last state and said first state.

20. The system of claim 18, wherein said trainer HMM computes output probabilities of said new middle state by averaging output probabilities of said last state and said first state.

21. The system of claim 18 wherein, among the HMMs stored in said first dictionary, HMMs of triphones have more states than HMMs of diphones, and HMMs of diphones are longer than HMMs of phonemes.

22. The system of claim 18, wherein lengths of the HMMs stored in said first dictionary (9) are selectable by a user of the system.

\* \* \* \* \*